United States Patent [19]

Davis

[11] Patent Number: 4,995,099
[45] Date of Patent: Feb. 19, 1991

[54] POWER CONSERVATION METHOD AND APPARATUS FOR A PORTION OF A PREDETERMINED SIGNAL

[75] Inventor: Walter L. Davis, Coral Springs, Fla.

[73] Assignee: Motorola, Inc., Schaumburg, Ill.

[21] Appl. No.: 504,073

[22] Filed: Mar. 28, 1990

Related U.S. Application Data

[63] Continuation of Ser. No. 278,319, Dec. 1, 1988, abandoned.

[51] Int. Cl.[5] .............................................. H04B 1/16
[52] U.S. Cl. ................................ 455/343; 340/825.44
[58] Field of Search ........................ 455/343, 228, 32; 340/825.44, 825.48; 375/106, 114, 116

[56] References Cited

U.S. PATENT DOCUMENTS

| | | |
|---|---|---|
| 3,769,593 | 10/1973 | Williams . |
| 3,783,384 | 1/1974 | Wycoff . |
| 4,370,753 | 1/1983 | Ehmke . |
| 4,385,398 | 5/1983 | Wycoff et al. . |
| 4,419,765 | 12/1983 | Wycoff et al. . |
| 4,523,332 | 6/1985 | Mori ................................... 455/343 |
| 4,663,623 | 5/1987 | Lax et al. ........................... 455/343 |

Primary Examiner—Reinhard J. Eisenzopf
Assistant Examiner—Curtis Kuntz
Attorney, Agent, or Firm—Philip P. Macnak; Vincent B. Ingrassia

[57] ABSTRACT

A receiver receives a transmitted signal having a periodic predetermined signal, a method and apparatus detects a first predetermined signal. Power may be conserved during a portion of a subsequent predetermined signal. The subsequent predetermined signal is divided into at least a first and second portion. If the first portion is detected, the subsequent predetermined signal is considered detected and power is conserved for the second portion. If the first portion is not detected, the receiver remains active for the second portion in order to detect the subsequent predetermined signal.

24 Claims, 6 Drawing Sheets

FIG.1 -PRIOR ART-

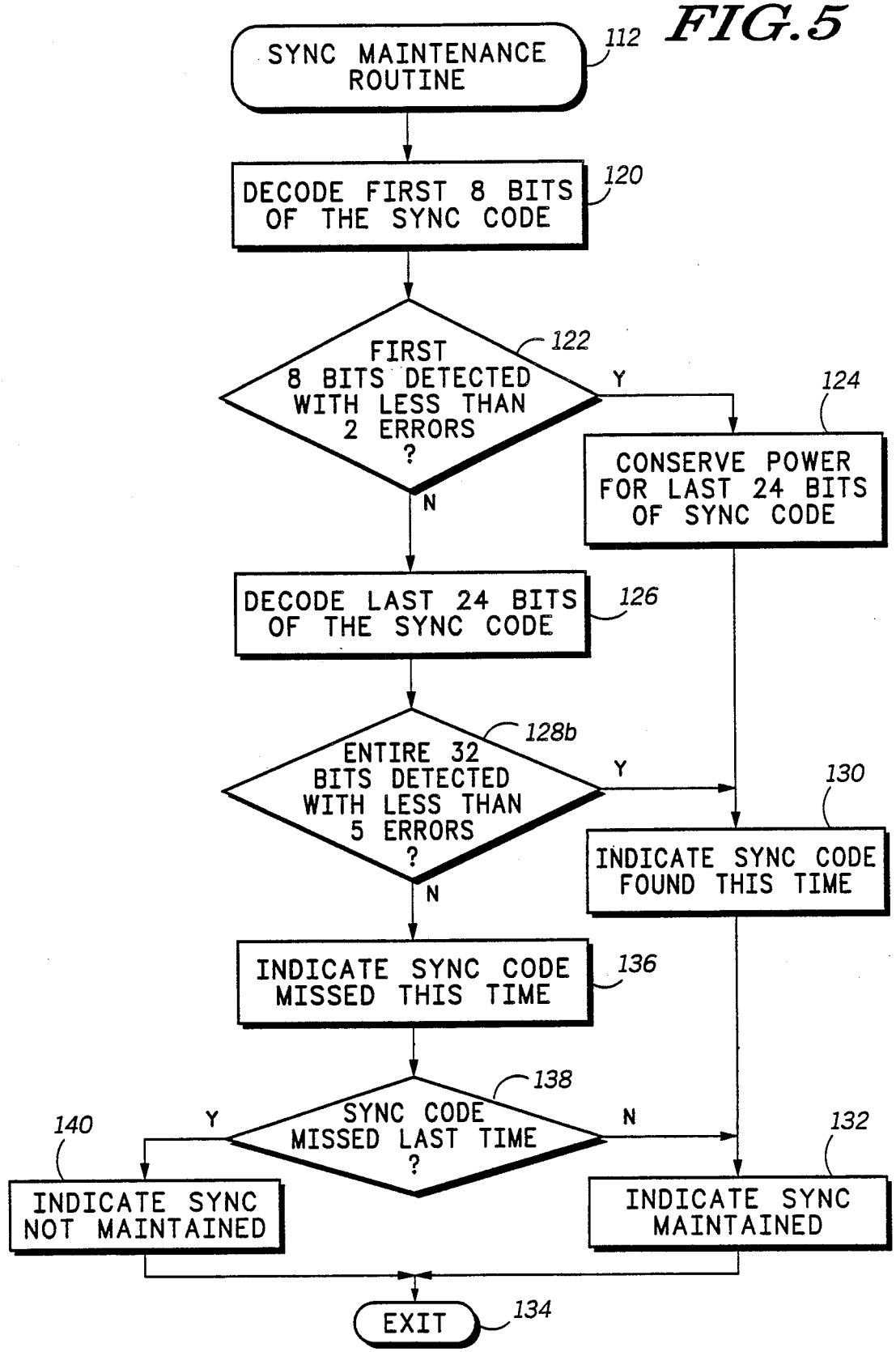

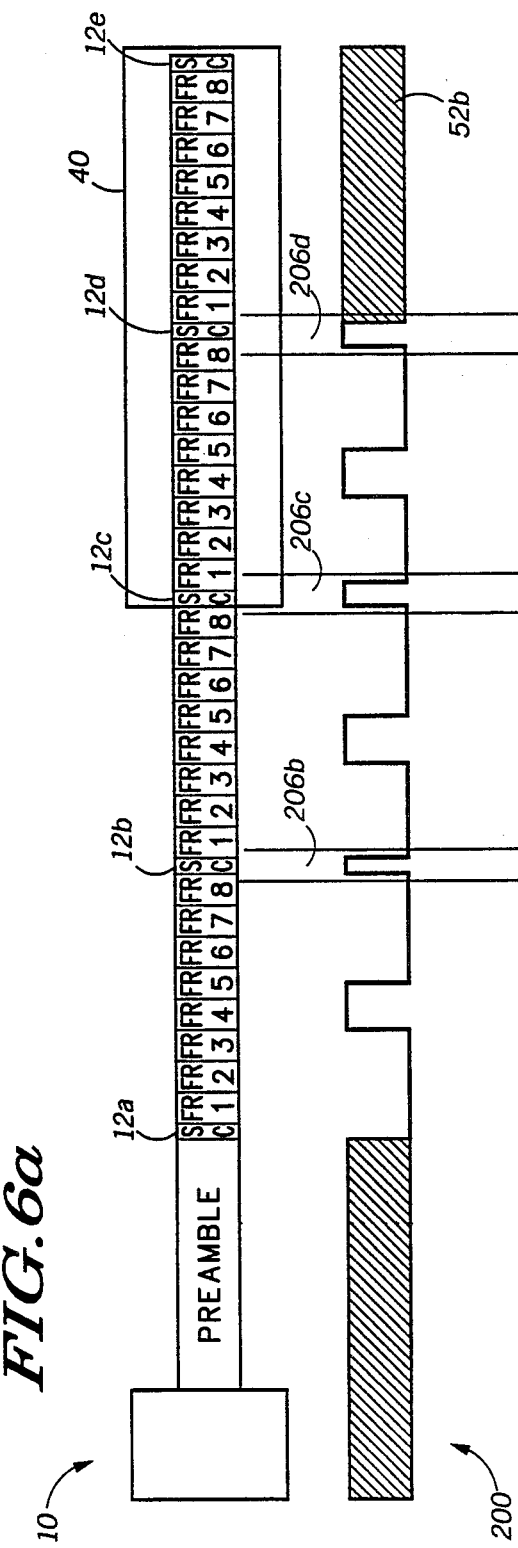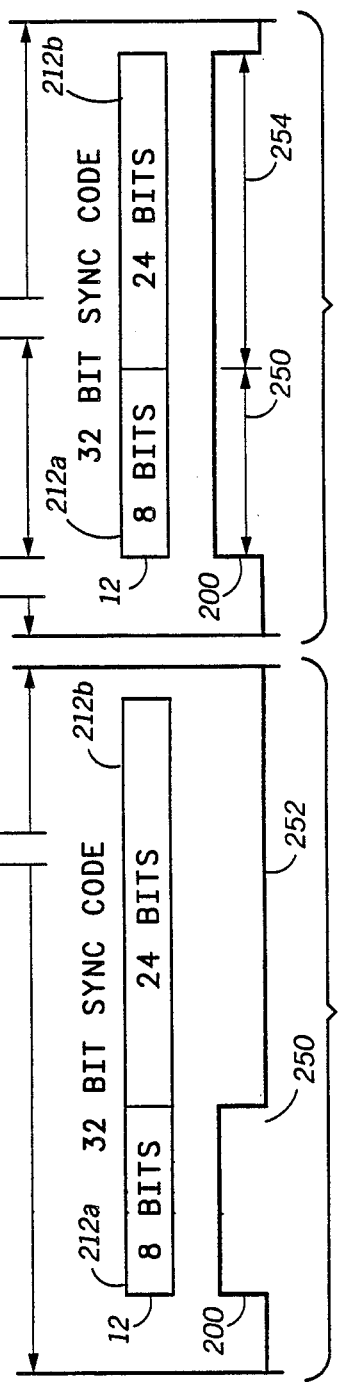

POWER CONSERVATION METHOD AND APPARATUS FOR A PORTION OF A PREDETERMINED SIGNAL

This is a continuation, division, of application Ser. No. 278,319, filed Dec. 1, 1988, now abandon.

BACKGROUND OF THE INVENTION

1. Field of the Invention

This invention relates generally to the area of conservation of power in a receiver, and more particularly to a method and apparatus for conserving power during a portion of the reception of a signal having a predetermined signal occurring at predetermined intervals.

2. Description of the Prior Art

A digital signalling protocol proposed by British Telecom in England is commonly termed POCSAG (Post Office Code Standardization Advisory Group) and provides a signal having a predetermined signal occurring at predetermined intervals. FIG. 1 shows a typical POCSAG protocol signal 10 and a power conservation strobe signal waveform 20 used in prior art receivers. The POCSAG signalling protocol is composed of batches wherein each batch includes a sync code 12 and eight frames of information 21-28. Each frame has two information words. An information word is a 32 bit binary word having 21 information bits and 11 parity bits. The information word is structured as a 31,21 extended BCH word having one extra parity bit, henceforth referred to as a 32,21 BCH word.

Area 30 of FIG. 1 represents a time when no signal is transmitted. The POCSAG signal begins with a preamble 32 which consists of an alternating pattern of logic "1" and "0" levels. The first batch following the preamble begins with a first sync code 12a. During the time spanning intervals 30, 32 and 12a, the receiver performs a sync acquisition process as indicated by area 52a of line 20 during which it first establishes bit sync with the signal and then establishes word or frame sync using processes well known in the art. After acquiring sync, the receiver begins a batch decoding process wherein the receiver decodes information within a preassigned frame. The information within the frame may include an address matching a preassigned address, in response to which the receiver would alert.

Assume the receiver operating per FIG. 1 has been preassigned to frame 4. Having acquired sync at the end of interval 52a, the receiver conserves power during interval 53a. The receiver operates in a fully operational, high power mode during interval 54a in order to decode information within frame 4. During interval 55a, the receiver operates in a low power, non-decoding mode until interval 56b wherein the receiver again operates in a high power mode in order to receive the second sync code 12b.

The power conservation cycle repeats for intervals 53b, 54b, 55b, and 56c. However, at interval 56c, the POCSAG signal 10 is terminated as indicated by the area 40. Termination of the signal occurs either when the POCSAG transmission is complete or when the signal is interrupted by noise. For the purpose of reference, the signal to which the receiver is synchronized is shown during interval 40 even though no signal is present. The receiver is not able to determine in interval 56c whether the sync code was not found because the transmission was completed, or because the signal interrupted by noise. Consequently, the receiver assumes the transmission is not complete and a noise interruption occurred. The receiver continues to search for information in interval 54c and sync code in interval 56d. Since in this example, the signal transmission has been completed, no information is received during interval 54c and no sync code is received during interval 56d. Upon determining that no sync code was received in two consecutive sync code intervals 56c and 56d, the receiver determines that the transmission has been completed and resumes the sync acquisition process as shown by area 52b.

Note that during interval 56b, the receiver operates in a high power mode for the entire duration of the sync code in order to determine the presence of the sync code 12b. The contents of the sync code is predetermined and generally, prior art receivers test for the termination of the transmission during the sync code.

With the growing success of digital paging systems, the length of data transmission signals has increased. FIG. 1 shows a two batch POCSAG signal. Oftentimes, POCSAG signals can be hundreds of batches long. In view of this and the ever decreasing size of paging receivers, batteries and consequently battery capacity, it is desirable to conserve power to the greatest extent possible during such transmissions. Additional conservation of power may be realized by conserving power during the transmission of predetermined signals such as the sync code signal used in the POCSAG protocol.

SUMMARY OF THE INVENTION

It is an object of the invention to provide a receiver which receives a transmitted signal having a periodic predetermined signal and which conserves power during a portion of the periodic predetermined signal.

It is another object of the invention to detect a first portion of a periodic predetermined signal and conserve power for a second portion if the first portion is detected.

It is yet another object of the invention to inhibit the power conservation for the second portion in order to detect the second portion if the first portion is not detected.

It is yet a further object of the invention to provide a method for conserving power within a receiver receiving a transmitted signal having a predetermined signal inserted at predetermined intervals. The predetermined signal has at least a first portion including a first predefined signal, and a second portion including a second predefined signal. The method comprising the steps of receiving and detecting a first predetermined signal, receiving the first portion of a subsequent predetermined signal, and conserving power during the second portion of the subsequent predetermined signal.

BRIEF DESCRIPTION OF THE DRAWINGS

FIG. 5 shows a flow chart of a second preferred embodiment of the sync maintenance routine of the present invention.

FIGS. 6a–6c show a POCSAG protocol signal and power conservation strobes for the first and second preferred embodiments of the present invention.

DESCRIPTION OF A PREFERRED EMBODIMENT

Figure 2:
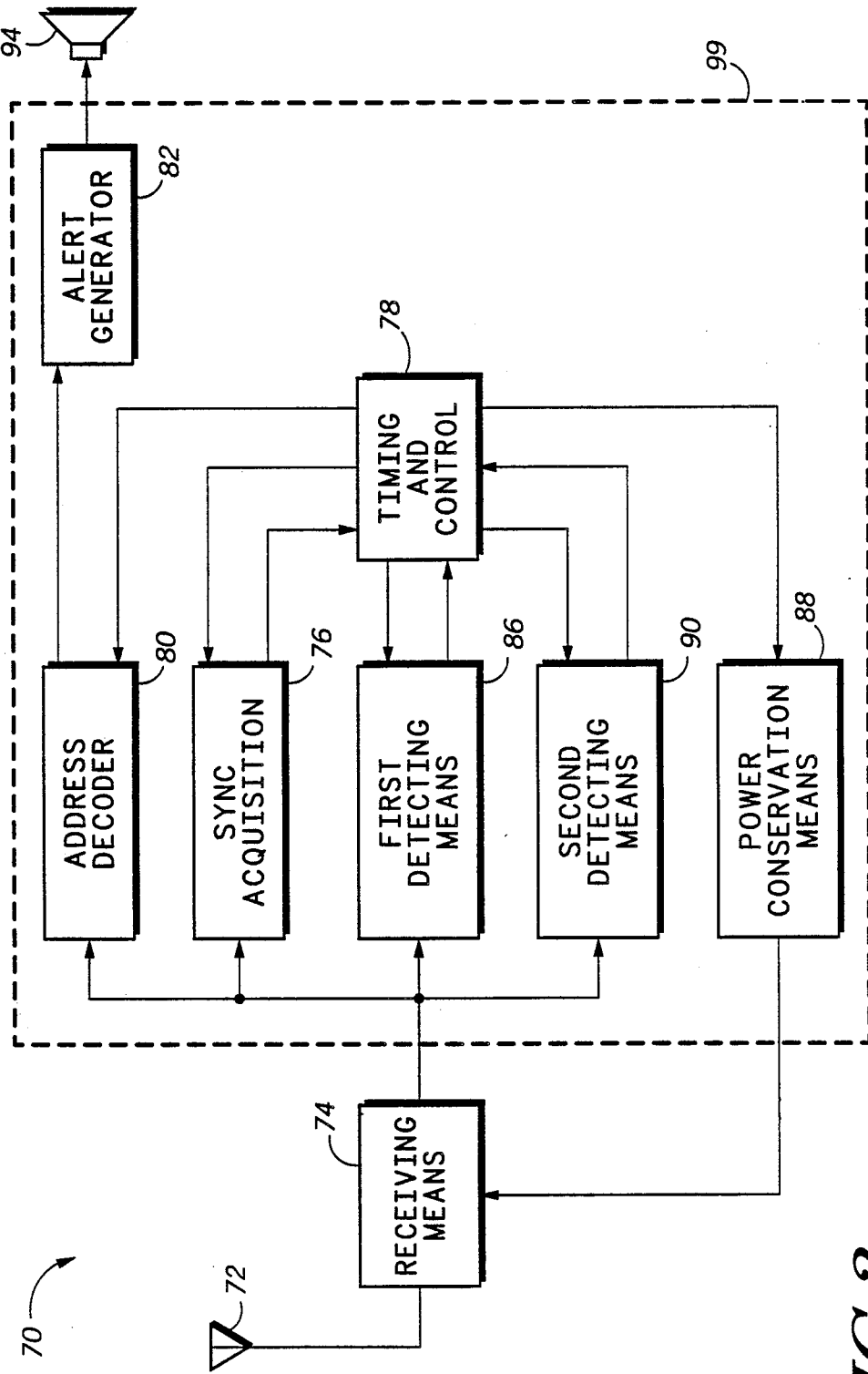
FIG. 2 shows a block diagram of a preferred embodiment of the receiver of the present invention.

FIG. 2 shows a block diagram of a preferred embodiment of the present invention. A POCSAG modulated signal enters receiver 70 through antenna 72 and is received and demodulated by receiving means 74. Synchronization to the demodulated signal is acquired by sync acquisition means 76. Then, under control of timing and control means 78, address decoding means 80 is enabled at an appropriate time, thereby enabling the receiver to decode information. The address decoder detects the presence of an address matching an address preassigned to the receiver. If the address of the receiver is found, alert generator 82 is activated and an audio signal is produced by transducer 94.

Also, in response to the timing and control means the first detecting means 86 is activated in coincidence with the expected occurrence of the first eight bits of the sync code. In the event the first eight bits are received with less than two bit errors, the sync code is considered detected and a signal from the first detecting means causes the timing and control means 78 to activate the power conservation means 88 for the remaining twenty four bits of the sync code. Power conservation means 88 disables power consumption by the receiving means 74 during the last twenty four bits of the sync code thereby conserving power during a portion of the sync code.

In the event the first detecting means does not detect the first eight bits, the timing and control means 78 causes second detecting means 90 to continue checking for the sync code. Note that during the continued checking, the receiver is left activated and power is not conserved. In a first embodiment, the second detecting means tests for a difference less than three between the last twenty four received bits with the last twenty four predefined bits of the sync code. Or in another embodiment the second detecting means will test the entire 32 bit sync code received for a difference less than five between the entire thirty two received bits with the thirty two predefined bits of the sync code.

Function blocks of 76 through 90 may be implemented in hardware circuits, however, the preferred embodiment implements these function blocks in a program having software routines which operate within host microcomputer as indicated by hatched lines. A host microcomputer such as the Motorola MC146805H2 microcomputer may readily implement the functions of blocks 80 through 90 and is a preferred host microcomputer. Descriptions are well known in the art that enable one skilled in the art to, with a microcomputer within a receiver, make the invention as described herein. Such descriptions include U.S. Pat. No. 4,518,961, May 21, 1985, to Davis et al; U.S. Pat. No. 4,649,538, Mar. 10, 1987, to DeLuca et al; and U.S. Pat. No. 4,755,816, July 5, 1988, to DeLuca which are hereby incorporated by reference.

Figure 3:
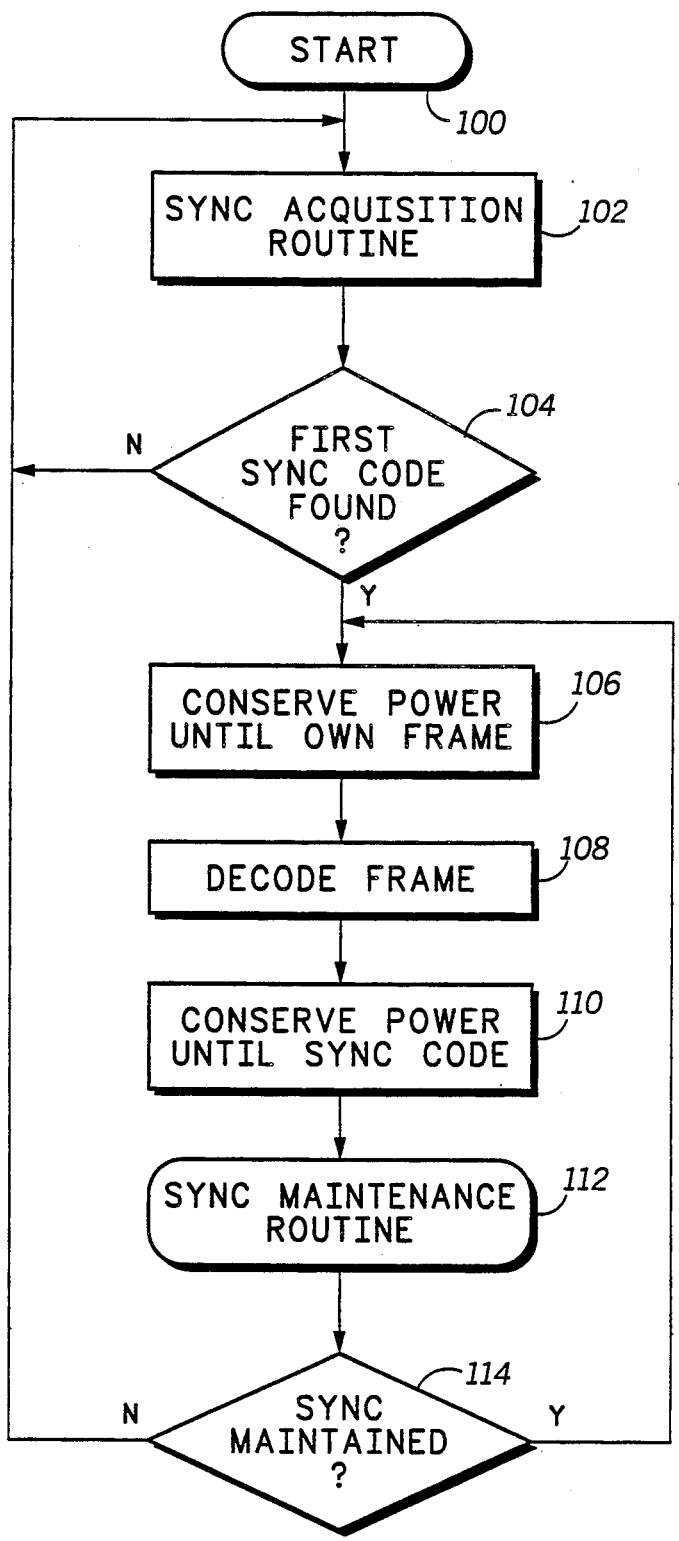
FIG. 3 shows a flow chart of the over all operation of a preferred embodiment of the present invention.

FIG. 3 shows a flow chart of the overall operation of a preferred embodiment of the present invention. Microcomputer 99 executes a program, the output of which implements the present invention. Note that the functions implemented by a microcomputer for the operation of the receiver are numerous and well known in the art. Only those functions necessary for description of the invention will be detailed herein. The program starts at step 100 which is typically a power on sequence. The program proceeds to the sync acquisition routine 102 which, as in the prior art, searches for and synchronizes to the POCSAG signal. Finding the first sync code in step 104 indicates synchronization to the POCSAG signal. Steps 102 and 104 are performed until synchronization to the POCSAG signal is achieved.

Upon synchronization, the programing proceeds to step 106 where power is conserved until the receiver's own frame. The power conservation includes operating either the receiving means 74 or the microcomputer 99, or other receiver circuitry in a low power mode.

Next, in step 108, the receiver is operated in a high power mode in order to receive and decode the frame. If the address of the receiver is found, an alert is generated. The operations of step 108 within a receiver are known in the art.

Next, in step 110, power is conserved until the next sync code. In step 112 a sync maintenance routine is performed. During sync maintenance, power may be conserved during part of the sync code. Two sync maintenance routines are detailed in FIG. 4 and FIG. 5. In the sync maintenance routine, the determination is made as to whether or not sync has been maintained.

After completion of step 112, the program then proceeds to step 114 to determine the result of the sync maintenance routine. If the determination is made that sync is maintained, the program returns to step 106 thereby continuing the decoding of the POCSAG signal. If, however, the determination is made that sync is not maintained, the program returns to step 102 to reacquire sync.

Figure 4:
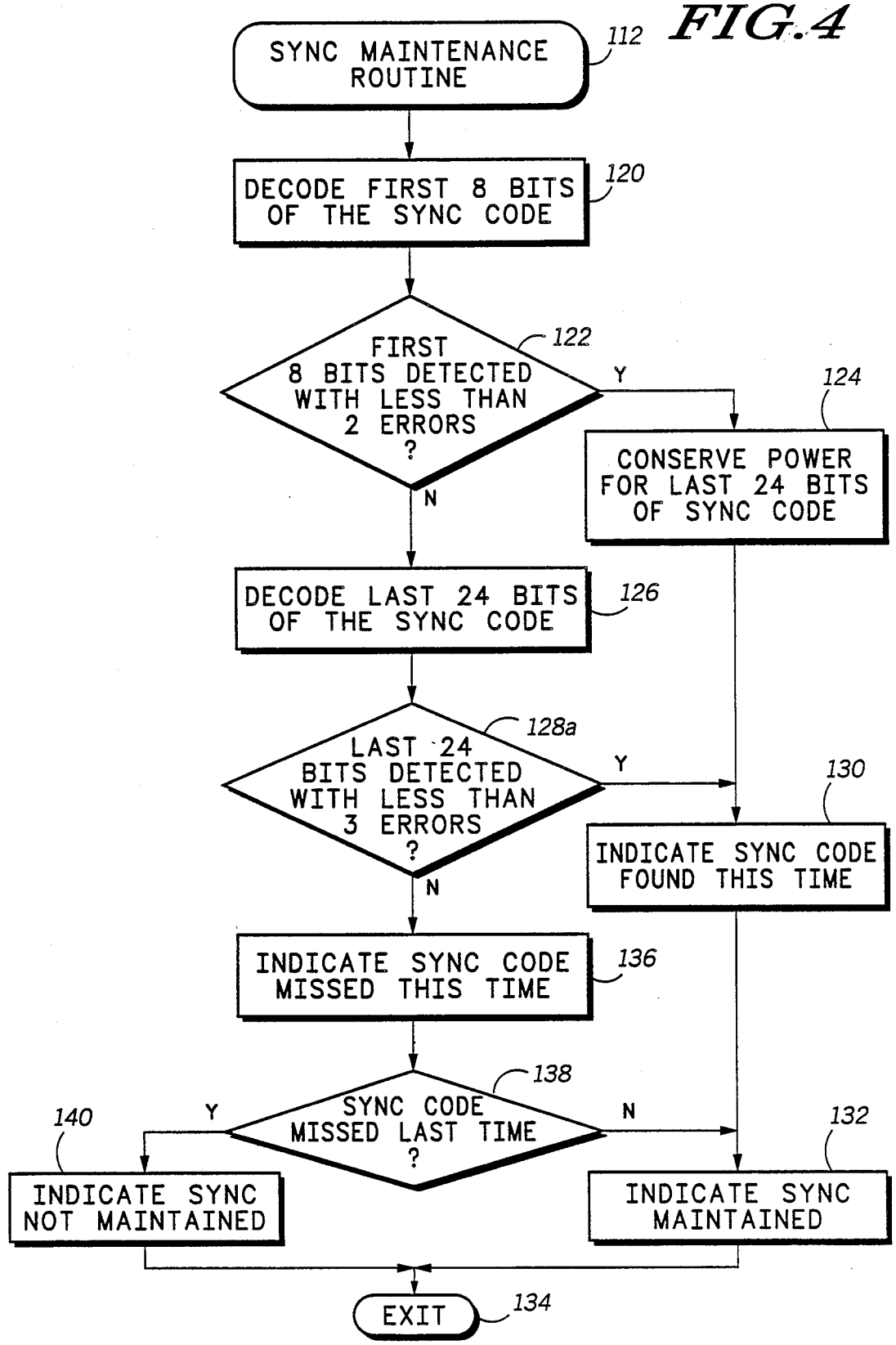
FIG. 4 shows a flow chart of a first preferred embodiment of the sync maintenance routine of the present invention.

Thus, the overall flow of the sync acquisition and the decoding and sync maintenance to the POCSAG signal have been shown. It has been stated that power conservation may be performed during the sync code of the POCSAG signal while maintaining other proper decoding and reacquisition processes. FIG. 4 and FIG. 5 detail two embodiments of the present that conserve power during the sync code.

FIG. 4 shows a flow chart of a first preferred embodiment of the sync maintenance routine of the present invention of the sync maintenance routine 112. First, in step 120, the receiver is enabled and the first eight bits of the sync code are received. Next in step 122 the first received eight bits are checked to have less than two errors from the first eight predefined bits of the sync code. If less than two errors are found, the program proceeds to step 124 to conserve power for the last 24 bits of the sync code. Power can be conserved by disabling either the receiving means or by operating the microcomputer in a low power mode, or by doing both.

If two or more bit errors are detected in step 122, the program proceeds to step 126 to receive and decode the last twenty four bits of the sync code. Note that in this step the receiver continues consuming power and thus power is not conserved.

The program then proceeds to step 128a in order to test the last 24 bits received in step 126. If less than three errors are found between the bits received in step 126 and the last twenty four bits of the predefined thirty two bit sync code, the second part of the sync code is considered detected and the program proceeds to step 130.

Step 130 may also be executed after completion of step 124. In step 130, the indication of the successful finding of the sync code is made for this execution of the sync maintenance routine.

The program then proceeds to step 132 to indicate that sync is maintained. This information will be used on step 114 of FIG. 3. After completion of step 132, the program exits the sync maintenance routine though exit step 134 thereby returning to execute set 114 of FIG. 3.

If, however, in step 128a three or more errors were detected, the sync code is considered missed and the program proceeds to step 136 to indicate that the sync code was missed this time. Next, in step 138, the previous decoding of the sync code is checked. If the sync code was found in the immediately preceding batch, the program proceeds to step 132 to indicate that sync is maintained. However, if the sync code was missed in the immediately preceding batch the program proceeds to step 140 to indicate that sync is not maintained. Then the program proceeds through the exit, step 134 form either step 132 or step 140 to step 114 of FIG. 3.

FIG. 4 shows a first way to conserve power during the sync code and determine if sync has been successfully maintained. If the first part of the sync code is found, power is conserved for the second part and sync is maintained. Under typical conditions, the first part of the sync code will be found. Under conditions where the signal is weak, noise may momentarily corrupt the signal and the first part of the sync code may be missed. If the first part is not found, the receiver remains operational for the second part. If the second part is found, then sync is maintained. Under very noisy conditions or in the event the signal transmission is completed, neither the first part nor the second part of the sync code will be found. If neither the first part nor the second part of the sync code is found for two consecutive expected occurrences of the sync code, then sync is considered not to be maintained. When sync is not maintained, the flow chart of FIG. 3 causes the receiver to perform a sync acquisition process.

FIG. 5 shows an alternate sync maintenance flow chart. All of the steps in FIG. 5 are identical to the steps in FIG. 4 except for step 128b. Refer to FIG. 4 for the description of steps other than step 128b of FIG. 5. Step 128b is executed after the first part of the sync code is not found and step 126 reads in the remaining 24 bits of the sync code are received. FIG. 5 in step 128b checks the entire 32 bit sync code received in steps 120 and 126 for the number of differences between the predetermined sync code and the received sync code. If less than five bit errors are detected, the program proceeds to step 130 to indicate that the sync code has been found. If five or more bit errors are found, the program proceeds to step 136 to indicate that the sync code has not been found this time. The remainder of the execution of the flow chart is identical to FIG. 4.

FIG. 5 shows a second technique for determining if the sync code has been found. If the first eight bits are not detected, then the entire thirty-two bit word is tested for bit errors. This is different from FIG. 4 in that only the last twenty four bits are checked for errors in FIG. 4. Either technique may be sufficient for the detection of the sync code.

Figure 1:
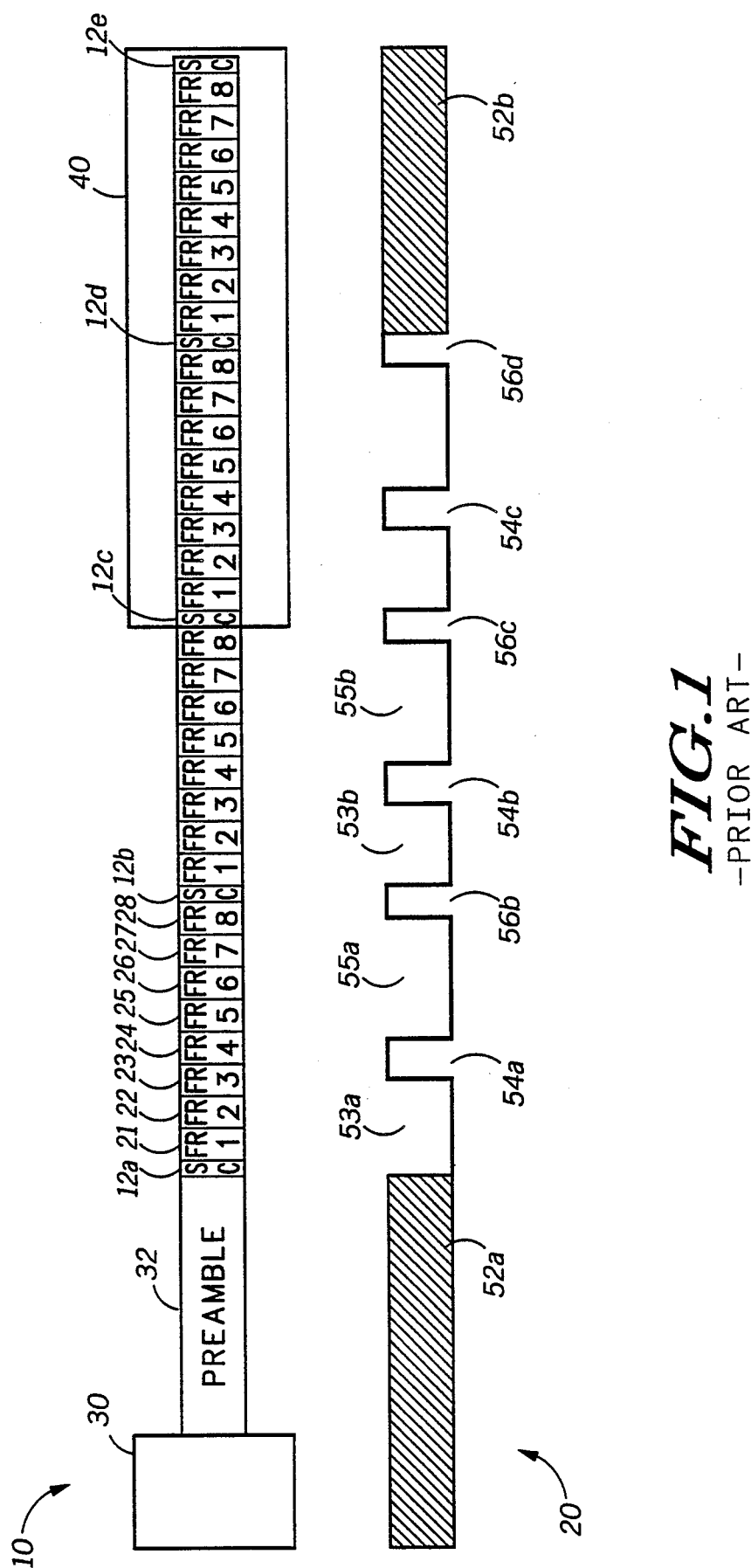
FIG. 1 shows a prior art POCSAG protocol signal and a power conservation strobe used in prior art receivers.

FIG. 6a shows a POCSAG protocol signal and the power conservation or battery saver strobe of the present invention. The POCSAG signal 10 is identical to the POCSAG signal of FIG. 1. Line 200 shows the power conservation strobe of the present invention. Except in intervals 206b, 206c and 206d, the operation of the receiver is identical to the receiver of FIG. 1. That is, the receiver turns on to search for a signal of the proper bit rate and stays on if a signal is received. Otherwise, it turns off. If bit sync is established, the receiver searches for the sync code word to establish full synchronization with the received signal. If it detects the sync code, it then switches on and off periodically to alternately search for addressed and sync signals.

FIG. 6b shows in detail the power conservation strobe of the present invention during interval 206b. Line 200 shows the receiver strobe active 250, for the first eight bits 212a of the sync code, 12. Upon detection of the first 8 bits the receiver strobe is inactive 252 for the last twenty four bits 212b, of the sync code 12, thus conserving power during the second twenty four bits.

Intervals 206c and 206d are shown in greater detail in FIG. 6c. Again sync code 12 is shown in two portions, the first portion is the first eight bits as indicated by 212a, and the second portion is the last twenty four bits as indicated by 212b. However, area 40 of FIG. 6a indicates that the signal transmission has ended thus no signal can be received by the receiver. Line 200 of FIG. 6c shows the receiver power strobe during intervals 206c and 206d. During the first eight bits of the sync code 212a, the power strobe indicates that the receiver is drawing power, while receiving and detecting the first portion of the sync code, as indicated by interval 250. During intervals 12c and 12d, the first portion is not received and detected because the signal is not being transmitted. Upon not detecting the first portion, the receiver continues operating in order to receive and decode the second portion of the sync code as indicated by interval 254. Since no signal is being transmitted, the second portion is also not detected. After interval 254, the sync code has been missed two consecutive times and the receiver returns the sync acquisition as indicated by interval 52b.

FIG. 6a shows a conservation in power during the reception of a sync code. During interval 12b, the receiver is consuming power for only a fraction of the sync code, while the prior art receiver of FIG. 1 consumes power for the entire sync code. FIG. 6a shows only a two batch POSCAG transmission. The present invention realizes even more power conservation when applied to POCSAG transmissions which may reach hundreds of batches in length.

Although the sync code is shown herein to be divided into only two portions, the scope of the invention also includes dividing a predetermined periodic signal such as the POCSAG sync code into more than two portions, wherein power may be conserved after the detection of any single portion or any combination of received portions. Furthermore, the number of errors selected in steps 122, 128a and 128b are believed to be optimal error counts, other error counts may be used while remaining in the scope of this invention. Additionally, the scope of the invention is neither restricted to the POCSAG signalling system in particular nor to digital signaling systems in general. The scope of the invention includes systems having at least one predefined signal in at least one predetermined location. For example, the predefined signal may comprise either digital or tone signals, and the first portion of the predefined signal may include any number of digital symbols or tones signals, wherein after receiving and detecting a first portion, power is conserved for a subsequent portion of the predefined signal.

What is claimed is:

1. A method for conserving power within a receiver which receives a transmitted signal having a predetermined signal inserted periodically at predetermined time intervals for synchronizing the receiver, the predetermined signal having at least a first portion including a first predefined signal, and a second portion including a second predefined signal, said method comprising the steps of:

(a) receiving and detecting a first predetermined signal to obtain synchronization of the receiver with the transmitted signal;

(b) thereafter receiving and detecting at least the first portion of each subsequently transmitted predetermined signal to maintain synchronization with the transmitted signal; and (c) conserving power during the second portion of each subsequently transmitted predetermined signal following the detection of the first portion of each subsequently transmitted predetermined signal.

2. The method of claim 1 wherein the received first portion signal includes a first predetermined number of information bits corresponding to the number of bits in the first predefined signal, and the received first portion signal is detected when the number of differences between the received first portion signal and the first predefined signal are less than a predetermined number of differences.

3. The method of claim 2 wherein the predetermined number of information bits in the first portion signal is eight and the predetermined number of differences is two.

4. The method of claim 1 further comprising the steps of:

(f) receiving and detecting the second portion of the subsequently transmitted predetermined signal in response to the first portion not being detected to maintain synchronization with the transmitted signal.

5. The method of claim 4 further comprising the step of returning to step (a) in response to the second portion of the subsequent predetermined signal not being detected within a predetermined period of time.

6. The method of claim 4 wherein the received second portion signal includes a second predetermined number of information bits corresponding to the number of bits in the second predefined signal, and the received second portion signal is detected when the number of differences between the received second portion signal and the second predefined signal are less than a predetermined number of differences.

7. The method of claim 6 wherein the predetermined number of information bits in the second portion signal is twenty-four and the predetermined number of differences is three.

8. The method of claim 4 wherein the received predetermined signal includes first and second predetermined number of information bits corresponding to the number of bits in the first and second predefined signals, and the received predetermined signal is detected when the number of differences between the received first and second portion signals and the first and second predefined signals respectively are less than a first and second predetermined number of differences, respectively.

9. The method of claim 8 wherein the predetermined number of information bits in the predetermined signal is thirty-two and the first predetermined number of differences is two for the first portion signal and the second predetermined number of differences is three for the second portion signal.

10. The method of claim 4 further comprising the step of maintaining the synchronization of the receiver in response to the combined received first and second portions being detected.

11. The method of claim 10 further comprising the step of returning to step (a) in response to the subsequent predetermined signal not being detected within a predetermined period of time.

12. The method of claim 10 wherein the predetermined number of information bits in the predetermined signal is thirty-two and the combined first and second number of differences is five.

13. The method of claim 1 wherein the receiver includes a receiving means which consumes power while receiving the signal wherein step (c) of conserving includes inhibiting the receiving means during the second portion thereby conserving power during the second portion.

14. The method of claim 1 wherein the receiver includes a decoding means which consumes power while detecting the first portion wherein step (c) of conserving includes inhibiting the decoding means during the second portion thereby conserving power during the second portion.

15. A receiver comprising:

receiving means for receiving a transmitted signal having a predetermined signal inserted periodically at predetermined time intervals for synchronizing the receiver, the predetermined signal having at least a first portion including a first predefined signal and a second portion including a second predefined signal;

synchronization means responsive to a first predetermined signal, for synchronizing the receiver with the transmitted signal in response to the first predetermined signal being detected;

timing means responsive to the synchronization means for producing a first timing signal indicative of the occurrence of the first portion of a subsequent predetermined signal and a second timing signal indicative of the occurrence of the second portion of the subsequent predetermined signal;

said synchronization means being further responsive to the first timing signal for maintaining synchronization with the transmitted signal when the first portion of each subsequently transmitted predetermined signal is received and detected; and conservation means being responsive to the second timing signal for disabling the receiving means during the second portion of each subsequently transmitted predetermined signal following the detection of the first portion of the predetermined signal.

16. The receiver of claim 15 wherein said synchronization means, in response to the first portion signal not being detected, is further responsive to the second timing signal for maintaining synchronization with the transmitted signal when the second portion signal of the subsequently transmitted predetermined signal is detected.

17. The receiver of claim 16 wherein the received second portion signal includes a second predetermined number of information bits corresponding to the number of bits in the second predefined signal, and the received second portion signal is detected when the number of differences between the received second portion signal and the second predefined signal are less than a predetermined number of differences.

18. The receiver of claim 17 wherein the predetermined number of information bits in the second portion signal is twenty-four and the predetermined number of differences is three.

19. The receiver of claim 16 wherein the received predetermined signal includes first and second predetermined numbers of information bits corresponding to the number of bits in the first and second predefined signals, and the received predetermined signal is detected when the number of differences between the received first and second portion signals and the first and second predefined signals respectively are less than a first and second predetermined number of differences, respectively.

20. The receiver of claim 19 wherein said synchronization means is further responsive to the first timing signal for maintaining synchronization of the receiver with the transmitted signal when the combined first and second portion signals of the subsequently transmitted predetermined signal are detected.

21. The receiver of claim 20 wherein the predetermined number of information bits in the predetermined signal is thirty-two and the combined first and second number of differences is five.

22. The receiver of claim 19 wherein the predetermined number of information bits in the predetermined signal is thirty-two and the first predetermined number of differences is two for the first portion signal and the second predetermined number of differences is three for the second portion signal.

23. The receiver of claim 15 wherein the received first portion signal includes a first predetermined number of information bits corresponding to the number of bits in the first predefined signal, and the received first portion signal is detected when the number of differences between the received first portion signal and the first predefined signal are less than a predetermined number of differences.

24. The receiver of claim 23 wherein the predetermined number of information bits in the first portion signal is eight and the predetermined number of differences is two.

* * * * *